United States Patent [19]

Faatz

[11] 4,272,498
[45] Jun. 9, 1981

[54] PROCESS FOR COMMINUTING AND ACTIVATING LIMESTONE BY REACTION WITH $CO_2$

[75] Inventor: Albert C. Faatz, Montclair, N.J.

[73] Assignee: Foster Wheeler Energy Corporation, Livingston, N.J.

[21] Appl. No.: 78,972

[22] Filed: Sep. 25, 1979

[51] Int. Cl.$^3$ .................. B02C 19/00; C01B 11/00; C01F 5/24
[52] U.S. Cl. .................................. 423/242; 423/430; 241/1
[58] Field of Search ............... 423/242 A, 430, 555; 241/1

[56] References Cited

U.S. PATENT DOCUMENTS

| | | | |
|---|---|---|---|
| 2,080,779 | 5/1937 | Lessing | 423/242 A |
| 2,139,808 | 12/1938 | Dean et al. | 241/1 |
| 3,258,209 | 6/1966 | Bennett | 241/1 |
| 3,352,498 | 11/1967 | Schulte | 241/1 |
| 3,545,683 | 12/1970 | Schulte | 241/1 |
| 3,848,070 | 11/1974 | Onozuka et al. | 423/242 A |
| 3,873,532 | 3/1975 | Dahlstrom et al. | 423/242 A |
| 3,906,078 | 9/1975 | Hausberg et al. | 423/242 A |

OTHER PUBLICATIONS

Johnston et al., The Complete Solubility Curve of Calcium Carbonate, J.A.C.S., 38, pp. 975–983, (1916).
McCoy et al., Equilibrium Between Alkali Earth Carbonates, Carbon Dioxide and Water, J.A.C.S., 33, pp. 465–473, (1911).
U.S. Bureau of Mines Report of Investigation, #3480, p. 62.
Gross et al., Explosive Shamering as a Possible Economical Method of Ore Prepartion, U.S. Bureau of Mines Report of Investigation, #3268, pp. 11–19.

Primary Examiner—O. R. Vertiz
Assistant Examiner—Gary P. Straub
Attorney, Agent, or Firm—Marvin A. Naigur; John E. Wilson; John J. Herguth, Jr.

[57] ABSTRACT

The present invention relates to a non-mechanical method of converting coarsely ground limestone to a very fine powder. A slurry of ground calcium carbonate or limestone is contacted with carbon dioxide gas at high pressure to convert the solids in the slurry to an unstable form. The carbon dioxide pressure is then instantaneously released to form a slurry of activated calcium carbonate particles substantially reduced in size. This activated calcium carbonate slurry may be used to scrub flue gases.

18 Claims, 4 Drawing Figures

DOUBLE ALKALI STACK GAS SCRUBBING SYSTEM

PROCESS FOR COMMINUTING AND ACTIVATING LIMESTONE BY REACTION WITH CO₂

BACKGROUND OF THE INVENTION

The use of aqueous limestone slurries to scrub flue gasses for the removal of sulfur dioxide is well known in the art. However, the reactivity of the limestone is such that it allows an unacceptable level of $SO_2$ slippage, i.e., $SO_2$ remaining in the scrubbed gas. In view of the relatively low reactivity of limestone it is common practice to calcine the limestone, drive off $CO_2$, and convert the limestone into CaO. When the latter is slurried in water, it forms $Ca(OH)_2$, which in slurry form exhibits advantages over limestone slurry in a number of areas, principally in reduced $SO_2$ slippage and in more complete utilization of the scrubbing reagent (i.e., a greater percent conversion of the calcium into $CaSO_3$).

The calcining of limestone is heat intensive. Kirk-Othmer gives a range of 3¼ to 10 million Btu of thermal energy required per ton of CaO produced. Over the past six years, the cost of fuel has greatly increased, adding to the desirability of "activating" limestone in a way less fuel-sensitive.

SUMMARY OF THE INVENTION

The process of the present invention "activates" powdered calcium carbonate by reacting it with water and carbon-dioxide gas. The reaction, which takes several hours to bring to completion, converts the solid limestone into an unstable solid calcium compound (believed to be calcium bicarbonate*). When the pressure on this unstable solid is suddenly reduced, this unstable solid reverts to its original composition (calcium carbonate), but in much finer particle size and with greater chemical reactivity. The effect may result from the formation of $CO_2$ gas within the particles by decomposition of the $Ca(HCO_3)_2$ thereby shattering the inelastic particles.

*Reported to be calcium bicarbonate by Johnston and Williamson, Journal of the American Chemical Society, Vol. 38, pp. 975–983 (1916), but unconfirmed by chemical analysis.

The reactions involved in the activation of the present invention are believed to proceed as follows:

$$CaCO_3 \text{ (limestone)} + H_2O + CO_2 \text{ (at 300 psig)} \rightarrow Ca(HCO_3)_2 \quad (1)$$

$$Ca(HCO_3)_2 \text{ (S) in water slurry} \rightarrow CaCO_3 \text{ (activated)} + H_2O + CO_2 \quad (2)$$

The activated $CaCO_3$, preferably in the form of a slurry to retain activity, may then be contacted with flue gas for the removal of $SO_2$ and other acid gases.

In an alternative embodiment the unstable solid [$Ca(HCO_3)_2$] is first converted to $NaHCO_3$ by reaction with $Na_2SO_3$ (or $Na_2SO_4$) exiting a flue gas scrubber as follows:

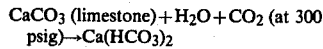
$$Ca(HCO_3)_2 + Na_2SO_3 \rightarrow 2NaHCO_3 + CaSO_3$$
(solids in H₂O)

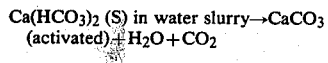
$$2 NaHCO_3 \rightarrow Na_2CO_3 + H_2O + CO_2$$

DESCRIPTION OF PREFERRED EMBODIMENTS

Figure 1:
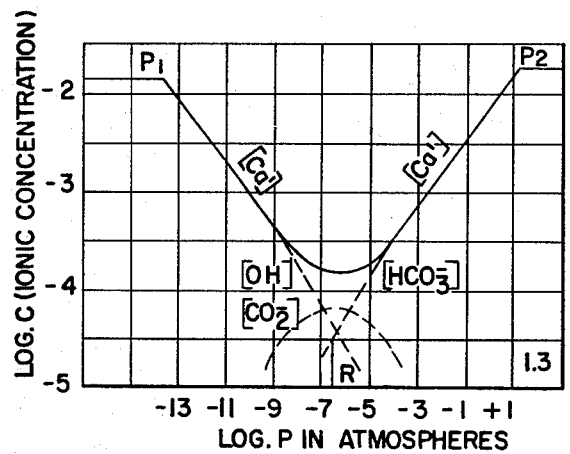
FIG. 1 is a phase diagram for CaO—H₂O—CO₂ at 16° C.

From the viewpoint of economics, limestone is the preferred starting material. Limestone is composed primarily of alkaline-earth carbonates. It may contain impurities, such as clay, sand, phosphate, and iron, but is often found in relatively pure forms. Limestone is primarily calcium carbonate ($CaCO_3$), but may contain magnesium carbonate ($MgCO_3$) in varying amounts up to about 45 wt. %. When the $MgCO_3$ content is more than 20%, the limestone is called "dolomitic limestone." Limestone is a sedimentary material, generally thought of as a rock, but the term includes fossil deposits, such as shell, chalk, coquina, and marl. Marble is crystallized limestone. Because of its ubiquity, and relative ease of mining, limestone is a cheap raw material. Accordingly, the term "limestone", as used herein, is meant to include dolomitic limestones, marbles and other calcium carbonate-containing rocks of sedimentary origin including shell, chalk, coquina, and marl.

Of course, other forms of calcium carbonate including calcite, can also be utilized.

The starting material is preferably limestone mechanically ground to a fine mesh. Finer mesh sizes speed the production of the activated calcium carbonate (reduce residence time in the pressurizer), but are more costly to produce. Mesh sizes, for example, of 100% through 70 mesh to 100% through 200 mesh are suitable. One advantage of the present invention is that it provides a very fine particle size (like talcum) without the energy consumption required for such size reduction by mechanical grinding.

The limestone slurry feed to the autoclave is formed in a conventional manner, e.g., by mechanical grinding, and typically contains 10–30% by weight solids. Solids concentration is not particularly critical and will be, at least in part, dictated by the capability of the stirrer in the autoclave to maintain a stirred suspension or slurry.

A conventional antifoaming agent may optionally be added to the limestone slurry feed to the autoclave.

It has also been discovered that sodium carbonate may advantageously be added to the limestone slurry. Amounts of sodium carbonate as small as 1–2% and less, based on the weight of limestone, have been found to significantly accelerate the formation of the unstable solid in the slurry.

The limestone slurry is contacted with carbon dioxide at a temperature and pressure at which the stable solid phase (see FIG. 1) is converted to the unstable solid form. Suitably, the pressure is 225 psia or more, preferably 300 psig or more. There is no known theoretical upper limit for the $CO_2$ pressure, the upper limit being imposed only by practical considerations including the pressure ratings of the apparatus used. At a $CO_2$ pressure level above about 300 psig, the solid $CaCO_3$ can be totally converted into the unstable solid $Ca(HCO_3)_2$, which latter has a solubility of about 0.3 wt. %. Thus, the $Ca^{++}$ ion concentration from $Ca(HCO_3)_2$ is about 0.075 gms./liter, vs. 0.11 gms/liter from $Ca(OH)_2$. It is theorized that at 16° C., the unstable calcium bicarbonate phase decomposes back into the carbonate when the $CO_2$ pressure is reduced below about 300 psig. It is found that solid limestone produces a much higher concentration of $Ca^{++}$ ions in water saturated with $CO_2$ gas, the $Ca^{++}$ concentration increasing with $CO_2$ partial pressure, than in $CO_2$-free water.

The minimum transition pressure (partial pressure of $CO_2$) at 25° C. is about 225 psia (about 210 psig) and at 16° C. is about 300 psig. The rate of dissolution of limestone in the autoclave is undoubtedly increased by higher temperatures. Higher temperatures favor conversion of $CaCO_3$ into the unstable solid form but such increase is partially offset by the decrease of the solubility of $CO_2$ in water as the temperature is raised. For this reason, and in view of the economics involved, ambient (or room) temperature is preferred.

The carbon dioxide pressure is maintained until at least a substantial portion of th particulate limestone is converted into the unstable solid form at which point the carbon dioxide pressure in the gas phase levels off indicating that little or no carbon dioxide is being absorbed into the liquid phase. Carbon dioxide must be added to the gaseous phase, as necessary, to maintain the desired pressure.

After reaching approximate equilibrium, or after substantial conversion to the unstable form, the slurry is instantaneously depressurized to a substantially lower pressure thereby effecting the desired size reduction. By "instantaneous" is meant about one second or less, preferably a fraction of a second. This may be accomplished in any convenient manner, for example, by passing the pressurized slurry through a conventional pressure let-down valve. While the mode of depressurization is not particularly important, per se, it is important to the instant invention that the depressurization be "instantaneous".

The $CO_2$ pressure after depressurization should be below 300 psig, but otherwise is not particularly critical. It is important only that the pressure drop be significant and that it occur instantaneously, although reduction of the pressure in several stages, such reductions each being "instantaneous" might be preferred in order to reduce the work requirements of the re-pressurizing of the $CO_2$ released from the slurry. The pressure may most conveniently be reduced to approximately atmospheric.

The calcium carbonate product, unlike gritty ground limestone, is a fine powder similar to face powder. The depressurization results in formation of a slurry of the active form of calcium carbonate, which slurry may then be used as is for sulfur oxide removal in a conventional wet scrubbing system. Alternatively, the precipitated active calcium carbonate can be separated from the solution in which it is formed for storage and subsequent use. However, surprisingly, it has been found that the precipitated calcium carbonate remains more active if not separated from the aqueous medium and dried.

FIG. 1 shows a theoretical phase diagram for a $CaO-H_2O-CO_2$ system at 16° C. In the phase diagram, the stable solid phase to the left of $P_1$ is calcium hydroxide, that between $P_1$ and $P_2$ is calcium carbonate, and that to the right of $P_2$ is calcium bicarbonate. $P_2$ is the transition pressure between calcium carbonate and bicarbonate. At pressures above $P_2$ the bicarbonate alone is stable. In an early article by Johnston and Williamson, published in the *Journal of the American Chemical Society*, Vol. 38, pp. 975-983 (1916), the teachings of which are incorporated herein by reference, $P_2$ was reported to be "about 15 atm." at 25° C., i.e., about 220 psia or 210 psig. FIG. 1 is reproduced from the article by Johnston and Williamson and shows $P_2$ to be 19.96 atm (log. 1.3) or 295 psig (about 300 psig) at 16° C.

Figure 2:
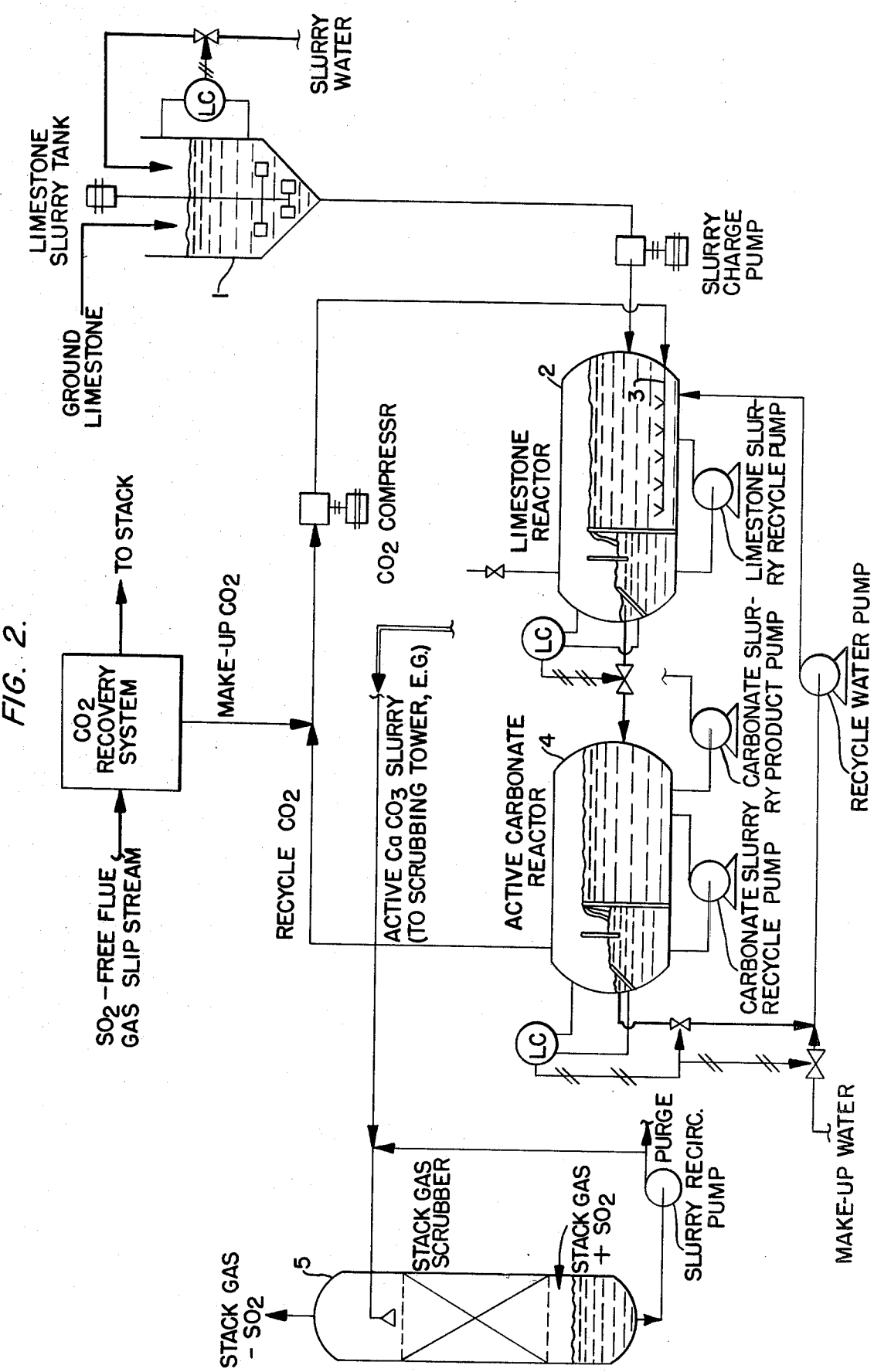
FIG. 2 is a schematic flow diagram of one embodiment wherein the present invention is adapted for flue gas wet scrubbing.

In the embodiment illustrated in FIG. 2, a slurry of ground limestone is formed by agitation in tank 1 and fed to the reactor 2 wherein it is reacted with carbon dioxide injected at 3 at about 500 psig. The pressurized solids slurry is then transferred with instantaneous pressure reduction to another reactor 4 wherein the active calcium carbonate of reduced size is thereby formed. This activated, depressurized slurry, diluted with water or scrubber fluid if desired, is then fed to a stack gas scrubber 5 for removal of sulfur dioxide and other acid gases.

Figure 3:
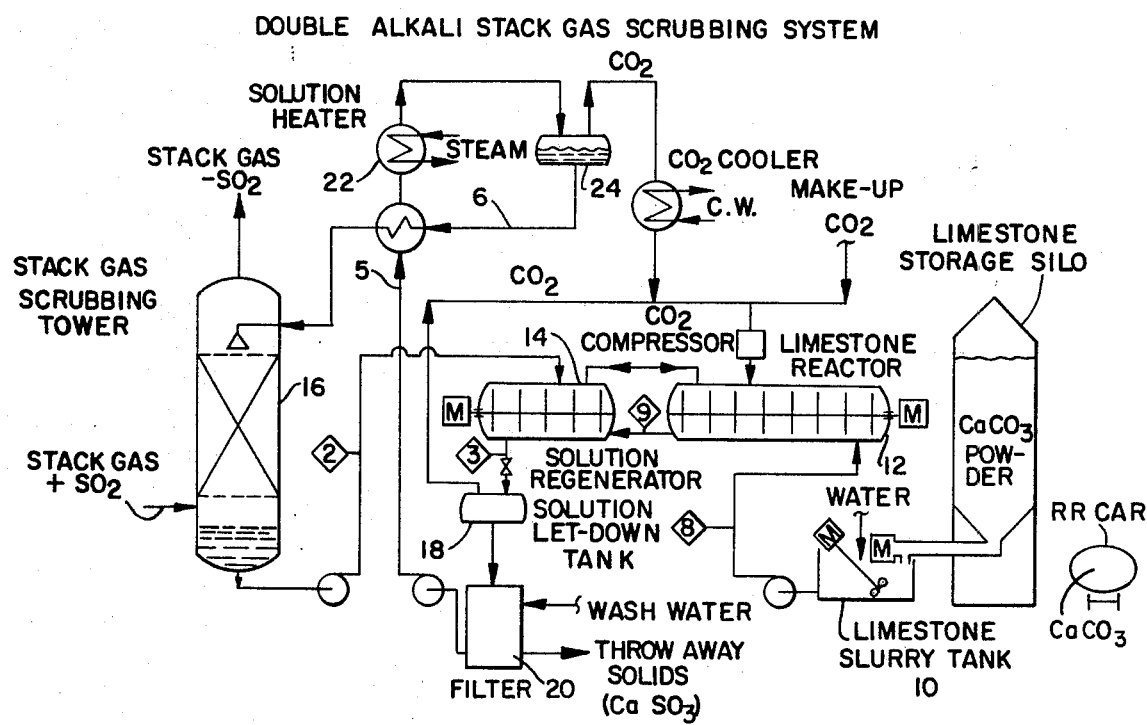
FIG. 3 is a schematic flow diagram of another embodiment wherein the present invention is adapted to a double alkali stack gas scrubbing system.

Another embodiment is depicted in FIG. 3 wherein the present invention is adapted to the so-called "double alkali" stack gas scrubbing system. In this alternative embodiment, a slurry 8 of finely-ground limestone is prepared in tank 10 and fed to a reactor 12 wherein it is reacted with carbon dioxide at a pressure of about 500 psig to form a pressurized slurry 9. The pressurized slurry is then introduced into a solution regenerator 14 wherein the relatively soluble unstable calcium compound readily reacts with a sodium sulfite or sulfate solution 2 exiting a stack gas scrubber 16 to form a slurry 3 containing calcium sulfite or sulfate solids and sodium bicarbonate in solution. The slurry 3 is then depressurized into let-down tank 18 and then introduced into filter 20 for removal of the calcium sulfite or sulfate solids. Alternatively, the calcium sulfite or sulfate solids may be separated from the sodium bicarbonate solution in regenerator 14. Then the solution may be depressurized into let-down tank 18. The filtered solution 5 is then heated by solution heater 22 and further depressurized in tank 24 to convert the sodium bicarbonate to sodium carbonate in solution 6 which is used to scrub the stack gas in tower 16.

Figure 4:
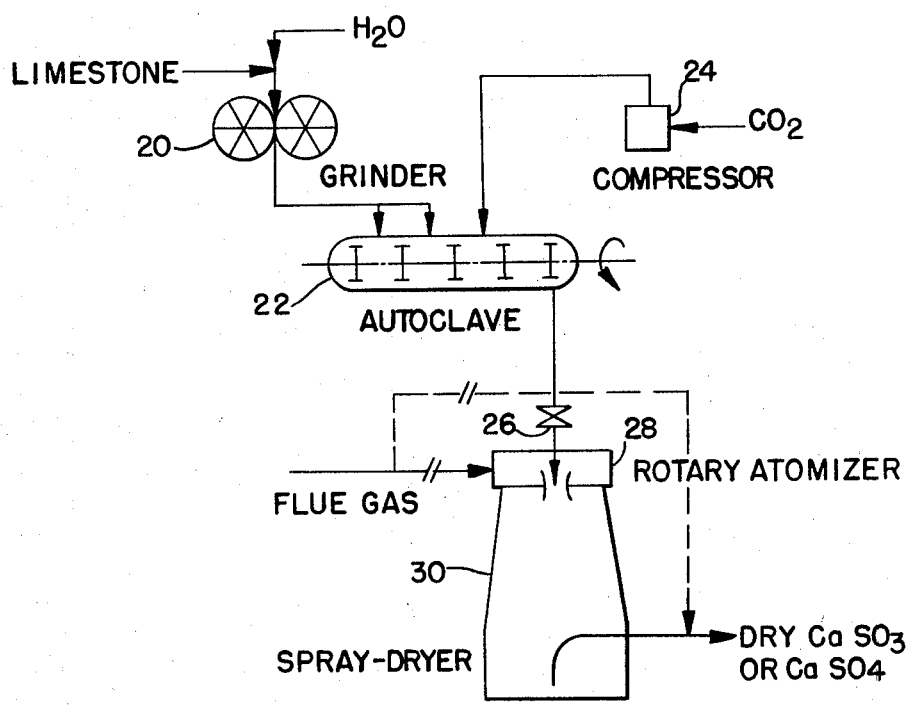
FIG. 4 is another embodiment wherein the present invention is adapted for flue gas scrubbing.

Yet another embodiment is shown in FIG. 4 wherein limestone is ground and admixed with water by grinder 20 to form a slurry as in the embodiments previously described. As in the previous embodiments, the ground limestone slurry is introduced into a stirred autoclave 22 wherein it is reacted with $CO_2$ at about 500 psig fed by compressor 24 to form a slurry of the unstable calcium compound. The slurry of the unstable compound is then injected through let-down valve 26 into a rotary atomizer 28 and spray-dryer 30. Upon passage through let-down valve 26, the slurry is instantaneously depressurized to approximately atmospheric pressure, thereby flashing to produce a highly reactive aerosol. In the spray-dryer 30, this calcium carbonate aerosol reacts with sulfur oxides and other acid gases contained in hot flue gas passing through the spray dryer. The slurry water is evaporated in spray-dryer 30 and the resulting dry product will consist mainly of calcium sulfite or sulfate, depending on the free oxygen content of the flue gas. The spray-dryer 30 used in this embodiment may be any one of those disclosed by L. A. Midkiff in "Spray-dryer System Scrubs $SO_2$", *Power*, January, 1979, Vol. 123, No. 1, pp. 29-32, the teachings of which are incorporated herein by reference.

The following laboratory tests serve to further illustrate the invention.

EXAMPLES

In Run No. 1, a 60 cc aqueous slurry containing 16⅔% ordinary ground limestone (agricultural-grade fineness, 7% $MgCO_3$) was poured into a glass absorption test cell having an inner diameter of approximately 7 cm and provided with a fritted glass disc near the bottom. A synthetic flue gas containing 4600 ppm of $SO_2$ was introduced through the fritted disc at 20 SCF/H. Samples were taken at 5, 10 and 15 minute intervals and analyzed for sulfur content. The results are shown in the table below.

In Run Nos. 2, 3 and 4, the same agricultural grade limestone as used in Test No. 1 (160 grams) was introduced into a two-liter Parr bomb equipped with a 6-bladed stirrer which rotated at 500 rpm. 800 ml of distilled water was introduced into the bomb, the head of the bomb was then attached and the interior slowly evacuated to 30 mm Hg abs. Carbon dioxide was then charged into the bomb interior at a pressure of 500 psig. It was necessary to periodically add carbon dioxide to the bomb as the pressure kept dropping. After the pressure reached substantial equilibrium, the pressure of the slurry was instantaneously released by blowing the slurry through a pressure reduction valve and 60 cc slurry samples were collected. In Test 2, the slurry sample was dried at room temperature, allowed to stand for three months and re-slurried (60 cc). This slurry sample was then introduced into a glass cell identical to that used in test 1 and tested in the same manner using the same synthetic flue gas containing 4600 ppm of $SO_2$. In Test 3, the freshly prepared sample was dried and immediately re-slurried and tested in the manner described above.

Test No. 4 repeated Test No. 3 because the analysis of the sample taken after 15 minutes seemed out of line.

In Test No. 5, a 60 cc sample of another freshly prepared slurry was introduced directly into the glass test cell, without any intervening drying step. The slurry sample here was prepared in the same manner described above only using a standard agricultural limestone containing 0.3 wt.% $MgCO_3$. After treatment in the Parr bomb with 500 psig $CO_2$ in the manner described above, it was tested in the glass cell using an identical synthetic flue gas in the manner described above.

REACTIVITY-TEST RESULTS

| Run No. | Reagent | Time | S Pick-Up Wt. % |
|---|---|---|---|
| 1 | Agricultural Limestone (7% $MgCO_3$) | 5 | 0.6 |
|   |   | 10 | 0.7 |
|   |   | 15 | 0.7 |
| 2 | $CO_2$ Treated Agricultural Limestone (7% $MgCO_3$) | 5 | 0.6 |
|   |   | 10 | 1.3 |
|   |   | 15 | 1.8 |
| 3 | $CO_2$ Treated Agricultural Limestone (7% $MgCO_3$) | 5 | 0.6 |
|   |   | 10 | 1.0 |
|   |   | 15 | 3.3 |
| 4 | $CO_2$ Treated Agricultural Limestone (7% $MgCO_3$) | 15 | 1.8 |
| 5 | $CO_2$ Treated Agricultural Limestone (0.3% $MgCO_3$) | 15 | 2.1 |

The results for Run No. 1 show that the ordinary ground limestone initially absorbs $SO_2$ very slowly, and quickly becomes "saturated". From the results for Runs 2-5, it can be appreciated that treatment with carbon dioxide in accordance with the present invention significantly increases the capacity of the ground limestone to absorb $SO_2$.

The very fine "activated" calcium carbonate provided by the present invention, in addition to use in the flue gas scrubbing previously described, would also be suitable for use as a pigment and in water treatment, coal desulfurization and soda ash production.

It is known that coal may be desulfurized by treating the coal with a solution of sodium carbonate under 1–10 atmospheres of air pressure. The resultant solution contains sodium sulfate. Regeneration requires lime treatment to precipitate calcium sulfate, and carbonation to change sodium hydroxide into sodium carbonate. These two steps could take place simultaneously in the limestone dissolution reactor of the present invention.

A cheap means for preparing soda ash might be the reaction of limestone and sodium sulfate solution in a limestone dissolution reactor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for activating and reducing the size of particulate limestone or calcium carbonate, said method comprising:
   (a) forming an aqueous slurry of the particulate calcium carbonate or limestone;
   (b) contacting said aqueous slurry with gaseous carbon dioxide at a pressure of carbon dioxide which is at least the minimum transition pressure required to convert calcium carbonate into an unstable solid calcium compound at the temperature employed, and continuing said contacting for a sufficient period of time to substantially convert said calcium carbonate into an unstable solid calcium compound; and
   (c) instantaneously reducing the pressure on the slurry to significantly less than said minimum transition pressure for the temperature employed, to produce an aqueous slurry containing calcium carbonate of a fine powder particle size.

2. The method of claim 1 wherein the pressure of the carbon dioxide in step (b) is at least 300 psig.

3. The method of claim 1 wherein the pressure of the carbon dioxide in step (b) is at least 500 psig.

4. The method of claim 1 wherein the pressure of the carbon dioxide in step (b) is at least 800 psig.

5. The method of claim 1 wherein said aqueous slurry formed in step (a) is 10–30% by weight solids.

6. The method of claim 1 wherein the particulate calcium carbonate or limestone in step (a) is 70 mesh or finer.

7. The process of claim 1 wherein 2% or less sodium carbonate, based on the weight of slurry solids, is added to the slurry in step (a).

8. A process for the removal of sulfur oxides from a gas mixture containing same, said process comprising:
   (a) forming an aqueous slurry of particulate calcium carbonate or limestone;

(b) contacting said aqueous slurry with gaseous carbon dioxide at a pressure of carbon dioxide which is at least the minimum transition pressure required to convert calcium carbonate into an unstable solid calcium compound at the temperature employed, and continuing said contacting for a sufficient period of time to substantially convert the calcium carbonate into an unstable solid calcium compound;

(c) instantaneously reducing the pressure on the slurry to significantly less than said minimum transition pressure for the temperature employed, to produce an aqueous slurry containing calcium carbonate of a fine powder particle size; and (d) contacting the gas mixture with the aqueous slurry containing calcium carbonate of a fine powder particle size formed in step (c).

9. The process of claim 8 wherein the pressure of the carbon dioxide in step (b) is at least 300 psig.

10. The process of claim 8 wherein the pressure of the carbon dioxide in step (b) is at least 500 psig.

11. The process of claim 8 wherein the pressure of the carbon dioxide in step (b) is at least 800 psig.

12. The process of claim 8 wherein said aqueous slurry formed in step (a) is 10–30% by weight solids.

13. The process of claim 8 wherein the particulate calcium carbonate or limestone in step (a) is 70 mesh or finer.

14. The process of claim 8 wherein 2% or less sodium carbonate, based on the weight of slurry solids, is added to the slurry formed in step (a).

15. The process of claim 8 wherein the gas mixture and the slurry are contacted in a drying zone in step (d) whereby substantially all of the aqueous phase of the slurry is evaporated producing a dry residue.

16. The process of claim 8 wherein a slurry containing calcium sulfite or sulfate is formed in step (d) and is removed from the contact zone.

17. A process for the removal of sulfur oxides from a gas mixture containing the same, said process comprising:

(a) forming an aqueous slurry of particulate calcium carbonate or limestone;

(b) contacting said aqueous slurry with carbon dioxide gas at a pressure of carbon dioxide which is at least the minimum transition pressure required to convert calcium carbonate into an unstable solid calcium compound at the temperature employed, and continuing said contacting for a sufficient period of time to substantially convert said calcium carbonate into an unstable solid calcium compound;

(c) contacting the slurry from step (b) with a solution of sodium sulfite or sulfate to form solid calcium sulfite or sulfate and sodium bicarbonate in solution;

(d) separating said solid calcium sulfite or sulfate from said sodium bicarbonate solution;

(e) releasing said pressure and then heating the solution to decompose the sodium bicarbonate and form a sodium carbonate solution; and (f) contacting said gas mixture with sodium carbonate solution for removal of sulfur oxides by absorption as sodium sulfite or sulfate in solution and recycling at least a portion of the sodium sulfite or sulfate in solution to step (c).

18. A process for the removal of sulfur oxides from a gas mixture containing the same, said process comprising:

(a) forming an aqueous slurry of particulate calcium carbonate or limestone;

(b) contacting said aqueous slurry with carbon dioxide gas at a pressure of carbon dioxide which is at least the minimum transition pressure required to convert calcium carbonate into an unstable solid calcium compound at the temperature employed, and continuing said contacting for a sufficient period of time to substantially convert said calcium carbonate into an unstable solid calcium compound;

(c) contacting the slurry from step (b) with a solution of sodium sulfite or sulfate to form solid calcium sulfite or sulfate and sodium bicarbonate in solution;

(d) releasing said pressure and separating said solid calcium sulfite or sulfate from said sodium bicarbonate solution;

(e) heating the solution to decompose the sodium bicarbonate and form a sodium carbonate solution; and, (f) contacting said gas mixture with said sodium carbonate solution for removal of sulfur oxides by absorption as sodium sulfite or sulfate in solution and recycling at least a portion of the sodium sulfite or sulfate in solution to step (c).

* * * * *